United States Patent [19]
Kohrt

[11] Patent Number: 5,777,223
[45] Date of Patent: Jul. 7, 1998

[54] MEASURING SYSTEMS FOR LINEAR OR ANGULAR MOVEMENTS

[75] Inventor: Jens Peter Kohrt, Koblenz, Germany

[73] Assignee: Lucas Industries public limited company, Solihullx

[21] Appl. No.: 712,903

[22] Filed: Sep. 12, 1996

[30] Foreign Application Priority Data

Apr. 15, 1994 [DE] Germany .............. 44 13 098.8

[51] Int. Cl.$^6$ .................. G01F 15/14; H01C 10/16
[52] U.S. Cl. .................. 73/432.1; 338/132
[58] Field of Search .................. 73/132, 129, 432.1; 338/118, 120, 123, 125, 126, 128, 130, 132, 160, 170

[56] References Cited

U.S. PATENT DOCUMENTS

| | | | |
|---|---|---|---|
| 2,720,572 | 10/1955 | Moore, Jr. | 338/132 X |
| 2,805,307 | 9/1957 | Bourns et al. | 338/126 X |
| 3,965,454 | 6/1976 | Puerner | 338/176 X |
| 4,039,994 | 8/1977 | Ward | 338/176 X |
| 4,139,831 | 2/1979 | Ortlieb et al. | 338/118 X |
| 4,426,634 | 1/1984 | Okuya et al. | 338/176 X |
| 4,693,111 | 9/1987 | Arnold et al. | 73/118.2 |
| 5,113,172 | 5/1992 | Lang | 338/130 X |
| 5,291,176 | 3/1994 | Fujita | 338/125 |

FOREIGN PATENT DOCUMENTS

| | | |
|---|---|---|
| 0321439 | 6/1989 | European Pat. Off. . |
| 6915696 | 9/1970 | Germany . |
| 3046363 | 3/1982 | Germany . |
| 3930571 | 3/1991 | Germany . |
| 9017451 | 4/1991 | Germany . |
| 4137092 | 5/1993 | Germany . |
| 2164655 | 6/1990 | Japan . |
| 2202677 | 9/1988 | United Kingdom . |
| 2274355 | 7/1994 | United Kingdom .......... 338/160 |

Primary Examiner—George M. Dombroske
Assistant Examiner—Paul D. Amrozowicz
Attorney, Agent, or Firm—Wood, Herron & Evans, L.L.P.

[57] ABSTRACT

A measuring system for linear and angular movements with a first length or angle sensor (3) which operates in accordance with a first measuring method and which converts an input value (s, alpha) in the form of a linear or angular movement into an electrically processible first output value (UPOT) is further developed to increase the functional reliability and to avoid "coomon model" errors in such a manner that a second length or angle sensor (1) which is mechanically coupled with the first length or angle sensor (3) is provided which operates to a measuring method that is different from the first measuring method, and which converts the linear and angular movement (s, alpha) into an electrically processible second output value (UPULS), with the first and second output value (UPOT, UPULS) being available for subsequent processing and evaluation.

19 Claims, 4 Drawing Sheets

MEASURING SYSTEMS FOR LINEAR OR ANGULAR MOVEMENTS

DESCRIPTION

The invention relates to a measuring system for sensing the position of a moving part, preferably for safety-relevant applications, and in particular to a measuring system with the characteristics of the preamble of claim 1. The invention also relates to the applications of such a measuring system.

The invention is based on a measuring system known from practical applications designed for linear and angular movements with a first length and angle sensor which functions in accordance with a first measuring method and converts an input value in the form of a linear or angular movement into an electrically processible first output value.

This can, for example, be implemented by means of a potentiometer wherein for the conversion of a mechanical input value, e.g. travel or angle of rotation, into an electrical output value, e.g. an electrical voltage, a sliding contact is guided along a resistance strip so that a dependence of the output value on the position of the sliding contact on the resistance strip and thus on the input value is created.

A prerequisite for the intended input/output signal behaviour of the potentiometer is a perfectly electrically conductive connection between the sliding contact and the resistance strip which, for example, is achieved by a sliding contact in the form of spring lever so that the sliding contact is permanently forced against the surface of the resistance strip under slight pressure.

Such potentiometers are primarily disadvantageous in that with increasing operating time and under the effect of the application force the surfaces of the sliding contact and the resistance strip are subject to wear due to friction which, taking the form of fine abrasion dust, is distributed over the surfaces of the sliding contact and the resistance strip and brings about an increase of the contact resistance which negatively influences the input/output signal behaviour of the potentiometer.

In particular with respect to the use in systems where safety is a critical aspect, it has been found disadvantageous that several potentiometers which are arranged parallel to each other are necessary for monitoring the potentiometer function so that a common input value is sensed several times and, by comparing the respective output values, a conclusion as to the presence of malfunctions can be drawn. This, however, is associated with high costs and requires additional installation space.

With the redundant design there is also the disadvantage that so-called "common mode" errors are not precluded because, on the one hand, the individual potentiometers are manufactured in accordance with the same technology and, on the other hand, the signal conditioning of the individual output values is performed in accordance with the same method.

DE 90 17 451 U1 discloses a teaching and demonstration apparatus for illustrating potential errors in the position measurement. This apparatus includes two length measuring devices for the incremental or absolute determination of the linear position of a spindle nut which is arranged on a spindle. The first length measuring device is secured in the finally adjusted installation position and serves as a basis for comparison. The second length measuring device can be varied specifically with respect to the installation position. It can be moved in parallel to the first length measuring device or tilted. A position display means with a display field for each of the length measuring devices is provided. The spindle can further be coupled with an angle measuring device for the indirect travel measurement, the measuring values of which capable of being compared with those of the length measuring device in the finally adjusted installation position. Finally, it is disclosed to couple several angle measuring devices with the spindle which differ from each other in the type of the measuring method.

A processing and output means for generating a common measuring value is not described here. Rather, it is the object of this known apparatus to simulate and demonstrate measuring errors which result from different measuring methods and measuring arrangements. The generation of such a common measuring value would obliterate or eliminate such errors so that the teaching or demonstration purpose of the apparatus would no longer be fulfilled.

DE 69 15 696 U1 describes a measuring head with a shaft which has shaft ends which protrude on either side out of a housing of the measuring head and which have one flange each so that it is possible to optionally connect the one or the other shaft end to a machine shaft to be monitored. The measuring head can thus be employed on machines which rotate both clockwise and anti-clockwise. Inside the measuring head the rotor of a measuring potentiometer as well as coding disks are connected with the shaft in such a way that they are secured against rotation. The coding disks can be designed as perforated or slotted disks or carry control vanes of ferromagnetic or electrically conductive material which generates electrical pulses upon passing proximity switches.

As a typical application of the measuring head, the braking of a crank-driven press is given. In order to determine the initiation time of the brake, the angular velocity of the shaft is first measured by determining the time between the signals which have been generated by the coding disk. Upon completion of the braking operation, i.e. the shaft has come to a standstill, an analog signal can be taken at the measuring potentiometer, which is proportional to the respective angular position of the shaft. The various measuring sensors of the measuring thus serve to measure different physical parameters (angular velocity and angular position upon shaft standstill).

U.S. Pat. No. 4,693,111 discloses a measuring sensor for linear movements which comprises several electric measuring tracks each of which being formed as a resistance strips. The resistance strips are either of different lengths (and of different resolutions) or they are of equal length and are arranged in a stacked manner. Optionally, the output value of one of the resistance strips can be supplied to further processing via a switch.

Such a measuring sensor does not include two measuring sensors which operate in accordance with different measuring methods. The arrangement serves to either provide different resolutions over the measuring range of the sensor as a function of the measuring position or to provide for a particularly high resolution. To this end, only one output value of one of the sensors is used in each measuring position. The sensor according to document 3 is not able to achieve a measurement which is especially reliable and unsusceptible to malfunctions.

DE 30 46 363 A1 discloses a position control system with a digital incremental measuring means which, as a result of using a discriminator and a computer, enables long distances to be determined with high resolution. The use of different measuring methods is not disclosed.

From DE 39 30 571 A1 it is known to measure the temperature of a selected component (e.g. a brake drum) in order to monitor a brake means for overloading by determining any exceeding of the permissible pressure-dependent deformation characteristic of the component.

The invention is therefore based on the object to further develop a measuring system of the initially mentioned type in such a manner that the above drawbacks are avoided and an increased functional reliability of the measuring system is achieved.

According to the invention, the object is solved by further developing the initially mentioned generic measuring system by means of the characteristics of the characterizing clause of claim 1.

This enables the processing of two signals of different origin which, as first and second output value, are characteristic of the same mechanical input value and which are used for evaluation purposes.

Thanks to the different (physically or principally, respectively) measuring methods, errors or defects which occur in the one length or angle sensor can be detected and corrected by the output value of the other length or angle sensor. Another possibility upon the detection of an error in the one output value to use only the other output value for evalation and further processing.

Preferably, the first length and angle sensor operates according to an analog measuring method and the second length and angle sensor to a digital measuring method. This is advantageous in that a very good decoupling of the respective possible interference effects on the two length and angle sensors is possible.

In a preferred embodiment first and second coverters are provided for the conversion of the first and second output value into respective first and second comparable measuring values and/or the measuring values or the output values, respectively, are processed in a processing and output means and then output.

Said converters and/or the processing and output means can be arranged very close to the two length and angle sensors (if necessary also on the same substrate) in order be able to supply a signal that has been processed to the maximum extent for further processing.

The first measuring method of the first length and angle sensor is preferably the sensing of electrical resistance, capacitance, inductance, light transmission or field strength values which continuously vary as a function of a travel or an angle, and the second measuring method of the second length and angle sensor is the sensing of electrical resistance, capacitance, inductance, light transmission or field strength values which vary in a pulse-type manner as a function of a travel or an angle. This means that principally the same measuring principles can be employed for both length and angle sensors. Due to the fact that in a concrete embodiment of the measuring system two different measuring methods are employed and that also different sensing and evaluating devices are employed for the realisation of continuously changing values on the one hand and pulse-type (digitally) changing values on the other hand, specific susceptibilites to failure of the one type of length or angle sensor can be compensated by the resistance of the other length and angle sensor in that respect.

In order to be able to determine an absolute position of the input values after a failure and the subsequent restoration of the supply voltage without having to reset the measuring system to a defined start position (smin, smax), it is advantageous if the first and/or the second length or angle sensor is a coded sensor which outputs an absolute output value as a function of the travel or the angle.

For some applications it may be sufficient or even advantageous that the first and/or the second length or angle sensor is an incremental sensor which outputs a relative output value as a function of a predetermined travel section or angle section. This enables a very simple evaluation (by counting the output pulses).

In a preferred embodiment the first length or angle sensor is formed as a potentiometer and the second length or angle sensor is formed as a mechanically scannable grid. The grid is preferably designed as an equidistant stripe pattern, and individual stripes of the grid are electrically connected with each other. In particular incremental or coded sensors offer the possibility of optical scanning.

Moreover, the first and second length or angle sensor are arranged in parallel or coaxially, and next to them at least one electrically conductive track is arranged for the supply of the operating voltage or the determination of the measuring values.

If one of the length or angle sensors, e.g. a potentiometer, a variable capacitor or the like, provides an output value which includes information on the absolute position, said output value can also be used as an input value for the other length or angle sensor if this is only able to determine a relative movement. In this manner the output value (reflecting merely a relative value) of the other length or angle sensor is superimposed with information on the absolute position. As a result, the two length or angle sensors are then no longer completely decoupled with respect to their mode of function; however, this embodiment may be adequate or even advantageous for some applications.

In the case of higher safety requirements it may, however, be necessary to keep the output value of the one length or angle sensor independent of the output value of the other length or angle sensor. Although the two output values are coupled via the input value, an influence on the one measuring method due to malfunctions or defects does not influence the other output value if the one measuring value is not used for obtaining the other output value, i.e. if it is not included in it.

In order to achieve the maximum possible reliability of the measuring value provided for the subsequent signal processing it is advantageous to have the processing and output means adapted for determining an expected value of the output of the one length or angle sensor from the output value of the other length or angle sensor, for comparing the expected value with the actual output value and, in the case of a deviation by a certain value, for generating an error signal. Alternatively or additionally, a direct correction of the output measuring value can be effected by the processing and output means.

From the variation of the first and/or second output value as a function of time and on the basis of its variation as a function of time, the processing and output means is also capable of determining whether the respective output value represents a possible correct value and, in the case of a deviation from the expected value by a predetermined value, of generating an error signal and/or correcting the error.

A modified determination of an expected value is that the processing and output means comprises a timer which supplies a time signal which is used for checking one or both output values on the basis of predetermined travel/angle time relations. With an incremental sensor as length or angle sensor, for example, the timer can specify a minimum and/or a maximum pulse duration which can be the output value or the output signal, respectively, of the length or angle sensor. Another possibility is to derive the expected pulse duration of an incremental sensor from the rate of change of a resistance, capacitance or similar value.

If additional information on the input value is required for the further signal processing, the processing and output means can preferably determine derived values, i.e. rate and/or acceleration of the input value, from the first and/or the second output value and the time signal on the basis of predetermined travel/angle time relations.

The determination of the derived values can also be effected in such a manner that the processing and output means determines the derived value from the first and/or the second output value on the basis of its variation as a function of time.

Moreover, a number of application situations exist in which a relative movement by a certain distance or a relative rotation about a certain angle is to be measured. In instances such as these it is not mandatory to determine an absolute position but it is sufficient to determine the relative movement. The subject matter of the invention as it is previously described is also suited for this purpose.

According to a preferred application of the previously described measuring system, it is employed in an electronic braking system with an electronically adjustable brake booster for motor vehicles, where an actuation of a brake pedal which is coupled with the brake booster causes a linear or an angular movement (s, alpha) which is sensed by the measuring system which is arranged at a suitable location in said system, with the measuring value and an error signal which might have been generated from the processing and output means in the electronic braking system being utilized for the generation of a control signal for the brake booster.

Further design characteristics and advantages of the invention will be explained in the following with reference to the drawings, in which:

FIG. 1 schematically shows an embodiment of the potentiometer system according to the invention, which preferably serves to sense a linear movement;

Figure 5:
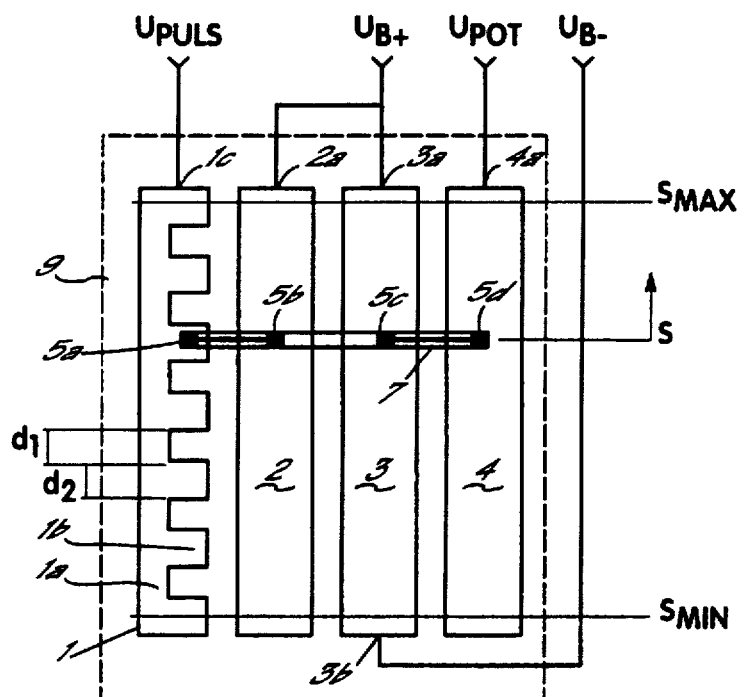
Figure 6:
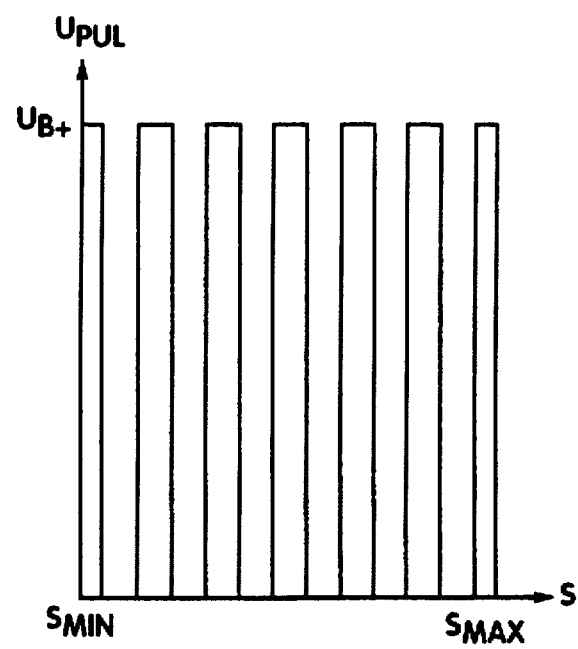
Figure 7:
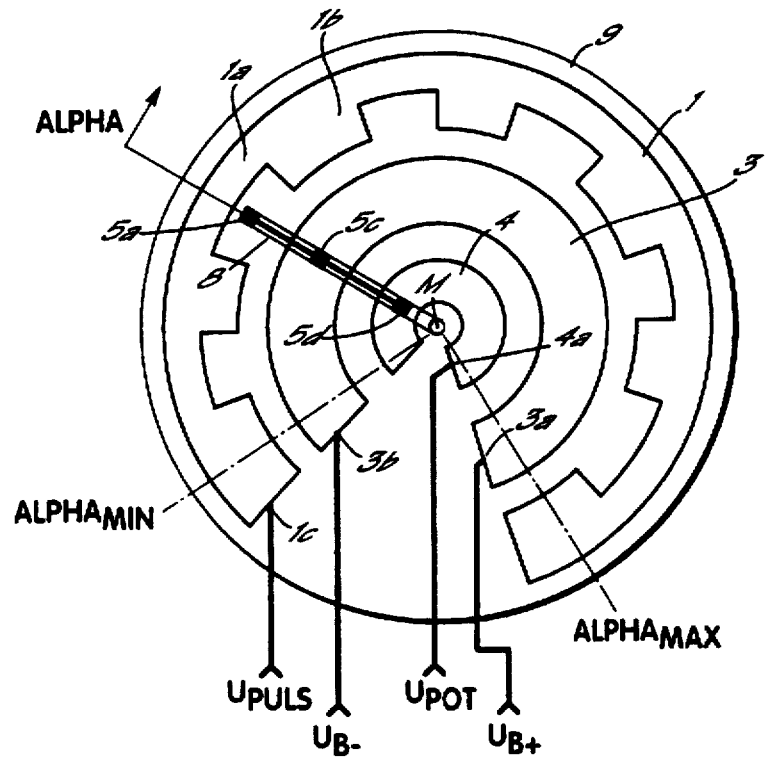
Figure 8:
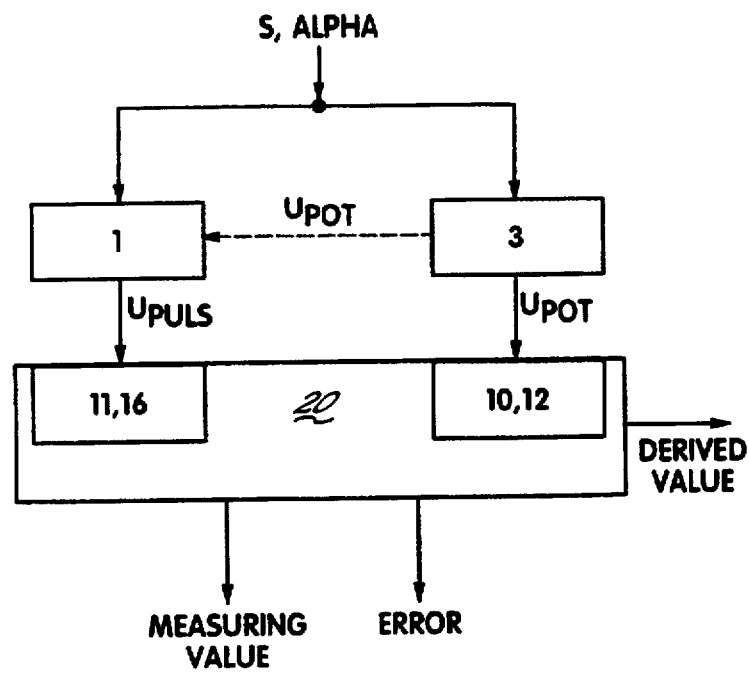

FIG. 5 schematically shows another embodiment of the potentiometer system according to the invention;

FIG. 6 shows the variation of the pulse-shaped output value as a function of the input value which results in accordance with the embodiment in FIG. 5;

FIG. 7 schematically shows an embodiment which preferably serves to sense an angular movement; and FIG. 8 shows a block diagram of the measuring system.

Figure 1:
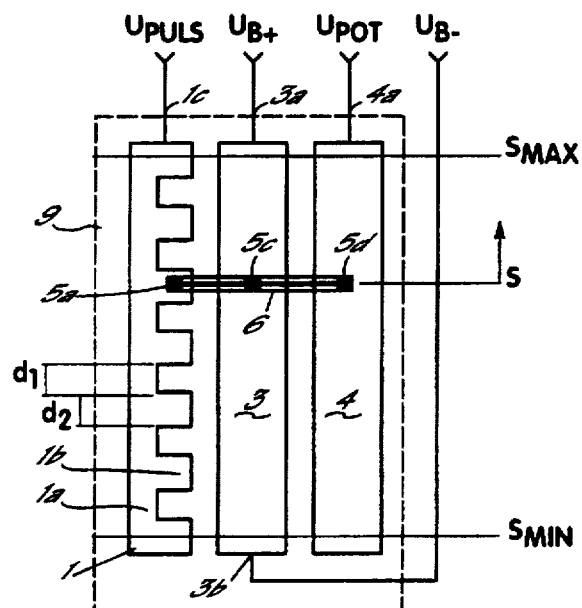

FIG. 1 shows three longitudinal sliding tracks on an electrically insulating substrate 9 arranged parallel to each other in the form of a comb-shaped (electrically conductive) sliding track 1, a resistance strip 3 as well as a homogeneous (electrically conductive) sliding track 4 on which sliding contacts 5a, 5c and 5d slide in the s direction in the range from smin to smax. A rigid and primarily perfectly electrically conductive connection is made by means of a connecting part 6 which is arranged transversely to the sliding tracks 1, 3, 4 and rigidly connected with the sliding contacts 5a, 5c und 5d. An input value s to be sensed is supplied via the connecting part 6 in a suitable manner, which need not be explained in detail.

The comb-shaped sliding track 1 is made from a continuous section 1a at which as an equidistant pattern in the s direction lateral projections 1b are formed over which the sliding contacts 5a slide.

The positive and negative operating voltage UB+ and UB−, respectively, is supplied at ends 3a and 3b each of the resistance strip 3. The potentiometer voltage UPOT, which is dependent on the input value s, is tapped off the resistance strip 3 via the sliding contact 5c, transferred to the homogeneous sliding track 4 via the sliding contact 5d and can be taken off at a point 4a for further signal processing.

Figure 2:
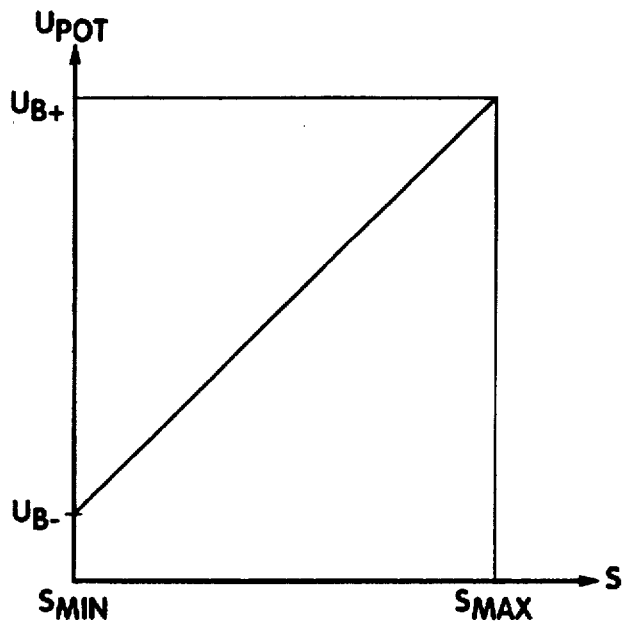
FIG. 2 shows a possible, in this case linear variation of the analog output value as a function of the input value.

FIG. 2 shows the variation of the potentiometer voltage UPOT for that case in which the connecting part 6 and, thus, the sliding contacts 5a, 5c and 5d are uniformly moved in the s direction within the range from smin to smax. Consequently, each position s is assigned a unique voltage value UPOT.

When the connecting part 6 is moved along the s direction, the contact breaker side 1b of the comb-shaped sliding track 1 is scanned via the sliding contact 5a which also carries the potentiometer voltage UPOT so that in point 1c a pulse-shaped voltage gradient UPULS can be taken off.

In this manner, in addition to the actual output value UPOT of the potentiometer, which as an analog signal reflects the absolute position of the sliding contact 5c on the resistance strip 3, a further output value UPULS is provided which indicates the relative position changes of the sliding contact 5c on the resistance strip 3 as a pulse sequence.

Figure 3:
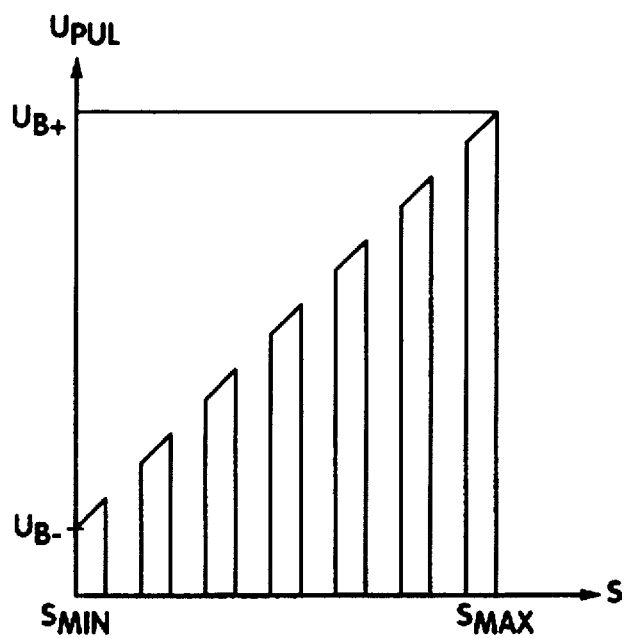
FIG. 3 shows a possible, in this case linear variation of the pulse-shaped output value as a function of the input value.

In the case of a uniform movement of the connecting part 6 in the s direction, the pulse-shaped voltage gradient UPULS is obtained as shown in FIG. 3. In areas where a contact making between the contact breaker side 1b and the sliding contact 5a occurs, the same UPULS curve results as for UPOT, otherwise UPULS drops to value in the order of zero.

With the connecting part 6 in a rest position which is never predetermined, UPULS assumes either the actual value of UPOT or the value of approx. zero.

This brings about the advantage that a downstream evaluation unit 20 can be supplied with output values UPULS, UPOT which are independent of each other so that the monitoring of both the potentiometer function as well as of the connection lines to the evaluation unit is enabled which is required for safety-critical systems.

With respect to the preferred use of microprocessors or microcontrollers as the evaluation unit it is found to be avantageous that the microprocessor or microcontroller is also monitored because the output values UPOT, UPULS are processed in independent analog and digital signal paths within the evaluation unit 20.

Another advantage is that the pulse sequence UPULS tapped off the comb-shaped sliding track 1 is not subject to any negative influence due to an increased contact resistance with an increasing operating time, thus possibly enabling it to be utilized for correcting the analog signal UPOT tapped off the resistance strip 3.

Figure 4:
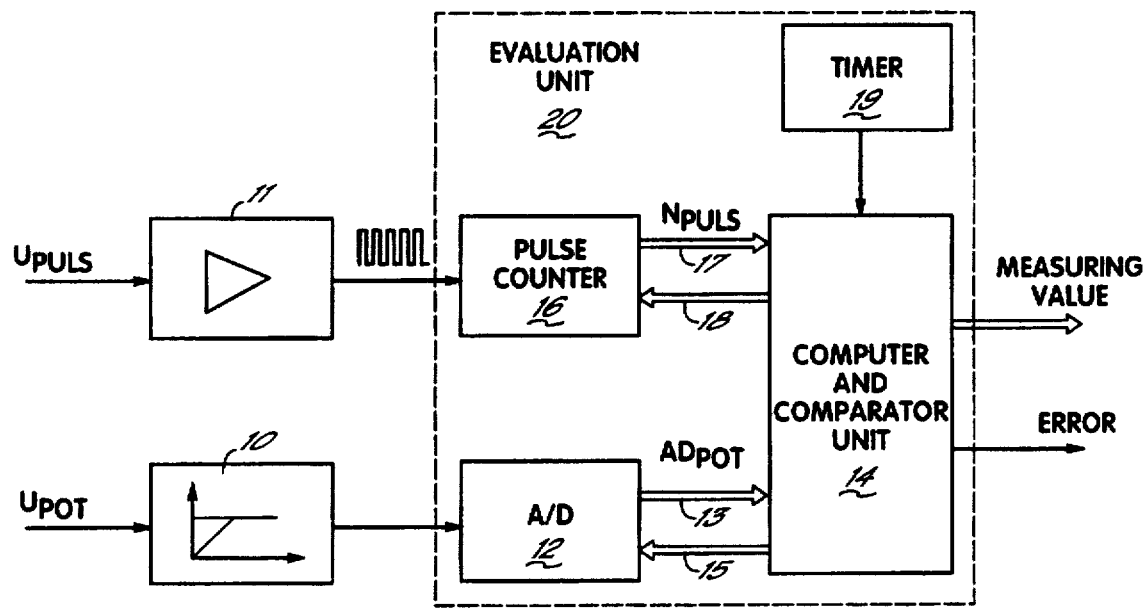
FIG. 4 shows a block diagram of a possible evaluation unit.

A possible way to further process the potentiometer voltage UPOT and the pulse-shaped voltage gradient UPULS will be explained with reference to FIG. 4.

Here, UPOT is supplied to an analog/digital converter 12, upstream of which a voltage limiter and a pulse shaper or filter module 10 are usually arranged as a safety precaution. The digitized value ADPOT is then supplied via a channel 13 to a computer and comparator unit 14, where the absolute position s can be determined on the basis of the input/output signal behaviour of the employed potentiometer system. The control of the analog/digital converter 12 is effected by the computer and comparator unit 14 via a channel 15.

UPULS is suitably amplified and filtered via a module 11 so that it can be supplied to a pulse counter 16 as a square pulse sequence. The counter value NPULS is transferred to the computer and comparator unit 14 via a channel 17 so that relative position changes delta s can be determined at the sliding track 1 upon movement of the connecting part 6 in the s direction with the knowledge of dimension d2 of the projections 1b in the s direction and of the distance d1 of two consecutive projections 1b in the s direction. The necessary control functions, such as resetting of the counter value NPULS, are again provided by the computer and comparator unit 14 via a channel 18.

Monitoring and/or correcting functions could be performed within the computer and comparator unit 14, for example via an algorithm in such a manner that always the last absolute position s(n-1) is buffered, after movement into a new absolute position s(n) the difference s(n)-s(n-1) is formed which is then compared with the independently determined relative position change delta s.

The timer 19 enables the computer and comparator unit 14 to detect the signals ADPOT and NPULS as a function of time and to thereby also determine parameters, such as velocity or acceleration, by means of using known length/time relationships.

In view of the fact that the function blocks analog/digital converter 12, computer and comparatur unit 14, pulse counter 16 as well as timer 19 are already provided as standard in commercially available microcomputers, the evaluation unit 20 can be implemented in a particularly simple and economical manner by using a microcomputer such as this.

FIG. 5 shows a further development of the embodiment according to FIG. 1, in which another homogeneous sliding track 2 is arranged on which another sliding contact 5b slides in the s direction within the range from smin to smax. The positive operating voltage UB+ is supplied at point 2a of the homogeneous sliding track 2. A rigid connection between the sliding contacts 5a-d is again provided by a connecting part 7; however, a perfectly electrically conductive connection only exists between the sliding contacts 5a and 5b as well as between the sliding contacts 5c and 5d.

If the contact breaker side 1b is scanned by the sliding contact 5a upon a movement of the connecting part 7 in the s direction, a pulse-shaped voltage gradient UPULS can be tapped off point 1c, which has a constant amplitude.

The voltage gradient for UPULS which is obtained with this embodiment at a uniform movement of the connecting part 7 in the s direction is shown in FIG. 6.

With this embodiment it is advantageous that, on the one hand, the module 11 for the signal conditioning of UPULS can be implemented in a simpler and thus more economic manner and, on the other hand, that the output values potentiometer voltage UPOT and pulse-shaped voltage gradient UPULS are completely decoupled from one another.

FIG. 7 shows an embodiment of the invention as it is preferably employed for sensing a rotational movement. Here, the homogeneous sliding track 4, the resistance strip 3 as well as the comb-shaped sliding track 1 are arranged coaxially to the centre M of the system.

The sliding contacts 5d, 5c and 5a are connected with each other in a rigid and perfectly electrically conductive manner via a connecting part 8 which has a rotatable pick-up so that on application of the input value alpha the sliding contacts 5d, 5c and 5a are guided on their associated sliding tracks (4, 3 and 1) radially towards the centre M in the range from alphamin to alphamax.

The application of the operating voltages UB+ and UB- is effected at the ends 3a and 3b of the resistance strip 3, the tapping of UPOT is performed at point 4a of the homogeneous sliding track 4, UPULS is tapped off point 1c of the comb-shaped sliding track 1.

With a uniform rotational movement of the connecting part 8 about the centre M in the range from alphamin to alphamax, the same gradient of UPULS will be obtained as is shown in FIG. 3 in the case of a linear resistance strip 3.

FIG. 8 shows a block diagram of the measuring system, which illustrates the principal functional mode. The input value s or alpha is supplied in parallel to the first and the second length or angle sensor 3, 1. The dotted line which connects the first length or angle sensor 3 with the second length or angle sensor 1 represents the modification shown in FIGS. 1 and 7, where the one output value (here UPOT) is modulated by the other output value (here UPULS) to obtain information on the absolute position s, alpha in both output values.

The two output values UPOT, UPULS are then supplied to the evaluation and processing unit 20 which processes the two output values and outputs a measuring value and an error signal, if applicable.

It must, however, be emphasized that besides all other already mentioned advantages the decisive advantage of the embodiment of the measuring system according to the invention as a potentiometer arrangement with an incremental sensor arranged in parallel is that it enables simple and economic manufacture and, above all, requires a very small installation space.

The previously discussed embodiment where a comb-shaped sliding track for generating the pulse sequence is applied in addition to the resistance strip provides an advantageous design with respect to its manufacture, however, the employment of optoelectrical, inductive or capacitive methods is also worth considering for the generation of the output value.

I claim:

1. A measuring system for linear and angular movements, comprising
    a first length or angle sensor (3) which operates in accordance with a first measuring method and which converts an input value (s, alpha) in the form of a linear or angular movement into an electrically processible first output value (UPOT);
    a second length or angle sensor (1) which is mechanically coupled with the first length or angle sensor (3) and which operates in accordance with a measuring method that is different from the first measuring method and which converts the linear and angular movement (s, alpha) into an electrically processible second output value (UPULS), with
    the first and second output value (UPOT, UPULS) being available for subsequent processing and evaluation, characterized in that the output value (UPOT) of the first length or angle sensor (3) also serves as an input value for the second length or angle sensor (1).

2. A measuring system for linear and angular movements according to claim 1, characterized in that
    a processing and evaluation unit (20) is provided which is adapted for processing the two output values and for outputting a measuring value and an error signal, if applicable.

3. A measuring system for linear and angular movements according to claim 1, characterized in that the first length or angle sensor (3) operates in accordance with an analog measuring method and the second length or angle sensor (1) operates in accordance with a digital measuring method.

4. A measuring system for linear and angular movements according to claim 1, characterized in that the output value of the first length or angle sensor is independent of the output value of the second length or angle sensor.

5. A measuring system for linear and angular movements according to claim 1, characterized in that first and second converters (10, 12; 11, 16) are provided for the conversion of the first and second output values (UPOT, UPULS) into first and second measuring values (ADPOT, NPULS) which are comparable to each other and which are processed in a processing and output means (20) and output.

6. A measuring system for linear and angular movements according to claim 1, characterized in that the first length or angle sensor (3) is capable of sensing electrical resistance, capacitance, inductance, light transmission or field strength values which continuously vary as a function of a travel (s) or an angle (alpha), and the second length or angle sensor (1) is capable of sensing electrical resistance, capacitance, inductance, light transmission or field strength values, which vary in a pulse-type manner as a function of a travel (s) or an angle (alpha).

7. A measuring system for linear and angular movements according to claim 6 characterized in that at least one of the first and the second length or angle sensors (3, 1) is a coded sensor which outputs an absolute output value which is dependent on the travel or the angle (s, alpha).

8. A measuring system for linear and angular movements according to claim 1, characterized in that at least one of the first and the second length or angle sensors (3, 1) is an incremental sensor which outputs a relative output value which is dependent on a predetermined travel or angle section.

9. A measuring system for linear and angular movements according to claim 1, characterized in that the first length or angle sensor (3) is designed as a potentiometer and the second length or angle sensor (1) is designed as a mechanically scannable grid (1b).

10. A measuring system for linear and angular movements according to claim 9, characterized in that the grid (1b) is designed as an equidistant stripe pattern.

11. A measuring system for linear and angular movements according to claim 10, characterized in that the individual stripes of the grid (1b) are electrically connected with each other.

12. A measuring system for linear and angular movements according to claim 1, characterized in that the first and the second length or angle sensors (3, 1) are arranged parallel or coaxially, respectively, to each other, adjacent to which at least one electrically conductive track (2, 4) which is arranged for the supply of the operating voltage or the determination of the measuring values.

13. An application of a measuring sensor for linear or angular movements comprising a first length or angle sensor (3) which operates in accordance with a first measuring method and which converts an input value (s, alpha) in the form of a linear or angular movement into an electrically processible first output value (UPOT), and a second length or angle sensor (1) which is mechanically coupled with the first length or angle sensor (3) and which operates in accordance with a measuring method that is different from the first measuring method and converts the linear and angular movement (s, alpha) into an electrically processible second output value (UPULS), with the first and second output value (UPOT, UPULS) being available for a subsequent processing and evaluation, for the construction of a measuring system for linear or angular movements.

14. A measuring system for linear and angular movements, comprising:

a first length or angle sensor (3) which operates in accordance with a first measuring method and which converts an input value (s, alpha) in the form of a linear or angular movement into an electrically processible first output value (UPOT);

a second length or angle sensor (1) which is mechanically coupled with the first length or angle sensor (3) and which operates in accordance with a measuring method that is different from the first measuring method and which converts the linear and angular movement (s, alpha) into an electrically processible second output value (UPULS);

the first and second output value (UPOT, UPULS) being available for subsequent processing and evaluation, characterized in that the output value (UPOT) of the first length or angle sensor (3) also serves as an input value for the second length or angle sensor (1); and a processing and evaluation unit (20) adapted for processing the two output values and for outputting a measuring value and an error signal, if applicable.

15. A measuring system for linear and angular movements according to claim 14, characterized in that the processing and output means (20) is adapted for determining an expected value of the output of the first length or angle sensor from the output value of the second length or angle sensor, for comparing the expected value with the actual output value and, in the case of a deviation by a certain value, for generating an error signal.

16. A measuring system for linear and angular movements according to claim 14, characterized in that the processing and output means (20) comprises a timer (19) which provides a time signal which is utilized for checking at least one of the output values (UPOT, UPULS) on the basis of predetermined travel/angle time relationships.

17. A measuring system for linear and angular movements according to claim 16, characterized in that the processing and output means (20) determines derived values from at least one of the first and the second output values (UPOT, UPULS) on the basis of predetermined travel/angle time relationships.

18. A measuring system for linear and angular movements according to claim 14, characterized in that the processing and output means (20) determines derived values (s, alpha), from at least one of the first and the second output values (UPOT, UPULS) on the basis of their variation as a function of time.

19. A measuring system for linear and angular movements according to claim 14, characterized in that the processing and output means (20) determines from the variation of at least one of the first and the second output values as a function of time on the basis of its variation as a function of time whether the respective output value represents a possible correct value.

* * * * *